(12) United States Patent
Dadalas et al.

(10) Patent No.: US 7,342,066 B2
(45) Date of Patent: Mar. 11, 2008

(54) AQUEOUS DISPERSIONS OF POLYTETRAFLUOROETHYLENE PARTICLES

(75) Inventors: Michael C. Dadalas, Eggenfelden (DE); Klaus Hintzer, Kastl (DE); Gernot Loehr, Burgkirchen (DE); Tilman Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 323 days.

(21) Appl. No.: 10/957,898

(22) Filed: Oct. 4, 2004

(65) Prior Publication Data

US 2005/0090601 A1 Apr. 28, 2005

(30) Foreign Application Priority Data

Oct. 24, 2003 (EP) .................. 03078358

(51) Int. Cl.
*C08L 27/12* (2006.01)

(52) U.S. Cl. .................. 524/544; 524/545; 526/242; 526/250

(58) Field of Classification Search .............. 524/544, 524/545; 526/242, 250
See application file for complete search history.

(56) References Cited

U.S. PATENT DOCUMENTS

| | | | |
|---|---|---|---|
| 2,037,953 A | 4/1936 | Watson et al. | |
| 2,434,058 A | 1/1948 | Stenzel | |
| 2,965,595 A | 12/1960 | Brinker et al. | |
| 3,037,953 A | 6/1962 | Marks et al. | |
| 3,142,665 A | 7/1964 | Cardinal et al. | |
| 3,489,595 A | 1/1970 | Brown, Jr, | |
| 3,692,569 A * | 9/1972 | Grot et al. ............ | 428/319.7 |
| 4,029,868 A | 6/1977 | Carlson | |
| 4,112,211 A | 9/1978 | Kuhls et al. | |
| 4,277,586 A | 7/1981 | Ukihashi et al. | |
| 4,282,162 A | 8/1981 | Kuhls | |
| 4,326,046 A | 4/1982 | Miyaka et al. | |
| 4,369,266 A | 1/1983 | Kuhls et al. | |
| 4,391,940 A | 7/1983 | Kuhls et al. | |
| 4,439,385 A | 3/1984 | Kuhls et al. | |
| 4,623,487 A | 11/1986 | Cope | |
| 4,864,006 A | 9/1989 | Giannetti et al. | |
| 4,940,525 A * | 7/1990 | Ezzell et al. ............ | 204/252 |
| 5,001,278 A | 3/1991 | Oka et al. | |
| 5,039,389 A * | 8/1991 | McMichael ............ | 204/282 |
| 5,229,480 A | 7/1993 | Uschold | |
| 5,285,002 A | 2/1994 | Grootaert | |
| 5,576,381 A | 11/1996 | Bladel et al. | |
| 5,608,022 A | 3/1997 | Nakayama et al. | |
| 5,688,884 A | 11/1997 | Baker et al. | |
| 5,700,859 A | 12/1997 | Ogura et al. | |
| 5,763,552 A | 6/1998 | Feiring et al. | |
| 5,804,650 A | 9/1998 | Tsuda et al. | |
| 5,895,799 A | 4/1999 | Wu et al. | |
| 5,955,556 A | 9/1999 | McCarthy et al. | |
| 5,973,091 A | 10/1999 | Schmiegel | |
| 6,025,307 A | 2/2000 | Chittofrati et al. | |
| 6,103,843 A | 8/2000 | Abusleme et al. | |
| 6,126,849 A | 10/2000 | Yamana et al. | |
| 6,395,848 B1 | 5/2002 | Morgan et al. | |
| 6,429,258 B1 | 8/2002 | Morgan et al. | |
| 6,566,452 B1 | 5/2003 | Blädel et al. | |
| 6,642,307 B1 | 11/2003 | Sogabe et al. | |
| 6,693,152 B2 | 2/2004 | Kaspar et al. | |
| 6,706,193 B1 | 3/2004 | Burkard et al. | |
| 6,720,437 B2 * | 4/2004 | Jones et al. .................. | 554/191 |
| 6,767,977 B2 * | 7/2004 | Arcella et al. .............. | 526/243 |
| 6,825,250 B2 | 11/2004 | Epsch et al. | |
| 6,833,403 B1 * | 12/2004 | Bladel et al. ............... | 524/458 |
| 7,041,728 B2 * | 5/2006 | Zipplies et al. ............. | 524/544 |
| 2003/0130458 A1 * | 7/2003 | Arcella et al. .............. | 526/246 |

FOREIGN PATENT DOCUMENTS

| | | | |
|---|---|---|---|
| CA | 2 354 138 A1 | | 6/2000 |
| EP | 0 006 346 | | 1/1980 |
| EP | 0 022 257 | | 1/1981 |
| EP | 0 320 156 A2 | | 6/1989 |
| EP | 0 446 725 A1 | | 9/1991 |
| EP | 0 481 509 | | 4/1992 |
| EP | 0 525 660 | | 2/1993 |
| EP | 0 712 882 | | 5/1996 |
| EP | 0 752 432 | | 1/1997 |
| EP | 0 816 397 | | 1/1998 |
| EP | 0 818 506 | | 1/1998 |
| EP | 0 969 055 | | 1/2000 |
| EP | 1 059 342 | | 12/2000 |
| GB | 642 025 | | 8/1950 |
| JP | 2003/268034 | * | 9/2003 |
| JP | 2003 3268034 | | 9/2003 |
| WO | WO 94/14904 | | 7/1994 |
| WO | WO97/17381 | | 5/1997 |
| WO | WO-00/35971 | * | 6/2000 |
| WO | WO 00/71590 | | 11/2000 |

(Continued)

OTHER PUBLICATIONS

*Fluoroplastics*, vol. 1, "Non-Melt Processible Fluoroplastics", p. 168-184, Sina Ebnesajjad, Plastics Design Library, Norwich, NY 2000.

*Primary Examiner*—David W. Wu
*Assistant Examiner*—Henry S. Hu
(74) *Attorney, Agent, or Firm*—Brian E. Szymanski

(57) ABSTRACT

The present invention provides an aqueous non-melt processible polytetrafluoroethylene dispersion comprising non-melt processible polytetrafluoroethylene particles in an amount between 30 and 70% by weight based on the total weight of the dispersion and one or more non-ionic surfactants and wherein at least a part of said non-melt processible polytetrafluoroethylene particles comprise polytetrafluoroethylene polymer chains having repeating units comprising ionic groups. The invention further provides a method for obtaining the dispersions.

9 Claims, No Drawings

FOREIGN PATENT DOCUMENTS

| | | |
|---|---|---|
| WO | WO 01/79332 | 10/2001 |
| WO | WO 02/072653 | 9/2002 |
| WO | WO 02/78862 | 10/2002 |
| WO | WO 03/020836 | 3/2003 |
| WO | WO 03/078479 | 9/2003 |
| WO | WO2004/041878 A1 | 5/2004 |

\* cited by examiner

AQUEOUS DISPERSIONS OF POLYTETRAFLUOROETHYLENE PARTICLES

This application claims priority from European Application No. 03078358.3, filed Oct. 24, 2003.

TECHNICAL FIELD

The present invention relates to aqueous dispersions of polytetrafluoroethylene particles that have, generally at their surface, polytetrafluoroethylene polymer chains that comprise repeating units that have one or more ionic groups. The present invention also relates to a method of making such aqueous dispersions.

BACKGROUND

Fluoropolymers, i.e. polymers having a fluorinated backbone, have been long known and have been used in a variety of applications because of several desirable properties such as heat resistance, chemical resistance, weatherability, UV-stability, etc. The various fluoropolymers are, for example, described in "Modern Fluoropolymers", edited by John Scheirs, Wiley Science 1997. The fluoropolymers may have a partially fluorinated backbone, generally at least 40% by weight fluorinated, or a fully fluorinated backbone. Particular examples of fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF).

In particular PTFE dispersions have found wide applications because of the unique and desirable chemical and physical properties of PTFE. For example, PTFE dispersions are frequently used in preparing coating compositions for coating metal substrates such as cookware because of the high temperature resistance of PTFE and anti-stick properties. The chemical resistance and corrosion resistance of PTFE have been exploited in industrial applications such as in chemical manufacturing plants. Because of its unrivaled weathering stability, PTFE has further been used for coating woven glass cloth for architectural fabrics. Details on fabrication and processing of PTFE-dispersions can be found in Fluoroplastics, Vol. 1, "Non-melt processible fluoroplastics", p. 168-184, Sina Ebnesajjad, Plastics Design Library, Norwich, N.Y., 2000.

Aqueous dispersions of PTFE are typically obtained by aqueous emulsion polymerization. The aqueous emulsion polymerization is typically carried out in the presence of a fluorinated surfactant. Frequently used fluorinated surfactants include perfluorooctanoic acids and salts thereof, in particular ammonium perfluorooctanoic acid. Further fluorinated surfactants used include perfluoropolyether surfactants such as disclosed in EP 1059342, EP 712882, EP 752432, EP 816397, U.S. Pat. No. 6,025,307, U.S. Pat. No. 6,103,843 and U.S. Pat. No. 6,126,849. Still further surfactants that have been used are disclosed in U.S. Pat. No. 5,229,480, U.S. Pat. No. 5,763,552, U.S. Pat. No. 5,688,884, U.S. Pat. No. 5,700,859, U.S. Pat. No. 5,804,650, U.S. Pat. No. 5,895,799, WO 00/22002 and WO 00/71590. The aqueous emulsion polymerization method to produce PTFE is well known and is described in for example U.S. Pat. No. 2,434,058, U.S. Pat. No. 2,965,595, DE 25 23 570 and EP 030 663.

Core-shell polymerization of PTFE has also been described to improve certain properties of PTFE. For example, core-shell polymerization of PTFE is described in U.S. Pat. No. 2,965,595, U.S. Pat. No. 3,142,665 and EP 525 660. EP 481 509 discloses a core shell polymerization to obtain PTFE that has good blending and dispersing properties in a resin, an elastomer, or a paint. It is taught in this patent that the shell of the PTFE particles should have a molecular weight of about 10,000 to 800,000 g/mol. A chain transfer agent is typically used to achieve the low molecular weight in the shell of the core shell particles.

WO 02/072653 teaches core shell PTFE dispersions that contain at least 1.5% by weight of rod-shaped PTFE particles that have a length to diameter ratio of at least 5. The majority of PTFE particles in the dispersion are cylindrical, i.e., having a length to diameter ratio of 1.5 or more. It is taught that such dispersions have an enhanced shear stability combined with a high critical cracking thickness. However, to produce non-spherical particles the polymerization conditions need to be carefully controlled. Moreover, WO 02/072653 teaches the use of a telogenic agent during the last stage of the polymerization, which will result in producing a substantial amount of very low molecular weight PTFE and which might potentially compromise the desirable properties of PTFE.

U.S. Pat. No. 4,326,046 teaches a core-shell polymerization of TFE to produce PTFE particles that have in their sheath layers modifiers that have ionic groups. It is taught that such modified PTFE particles can be used in making cation exchange membranes. The amount of the modifier may be up to 30% by weight.

For use in making coating compositions, the dispersion is generally upconcentrated following the aqueous emulsion polymerization to yield the desired fluoropolymer solids, which is typically between 40 and 70% by weight. Methods of upconcentration include for example thermal upconcentration, ultrafiltration as disclosed in U.S. Pat. No. 4,369,266 and decantation as disclosed in U.S. Pat. No. 2,037,953. Generally, the dispersions are up concentrated in the presence of a stabilizing surfactant such as a non-ionic surfactant.

In many applications, the PTFE dispersion resulting after polymerization and upconcentration are combined with further additives or components to produce a final composition. For example, in metal coatings, in particular for coating cookware, the final composition may be obtained by further blending heat resistant polymers such as polyamide imide, polyimide or polyarylen sulphide with the PTFE dispersion. Still further ingredients such as pigments and mica particles may be added as well to obtain the final coating composition for coating metal. Such additional components are typically dispersed in organic solvents such as toluene, xylene or N-methylpyrrolidone. The fluoropolymer dispersions typically represent about 10 to 80% by weight of the final composition. Coating compositions for metal coatings and components used therein have been described in e.g. WO 02/78862, WO 94/14904, EP 22257 and U.S. Pat. No. 3,489,595.

Problems may however arise in the preparation and/or application of the final coating composition to a substrate such as for example a metal substrate for cookware. For example, when spraying such a coating die clogging may occur after some time. Furthermore, coagulation may occur in the pumping system when pumping the dispersion to a coating station for coating for example glass fabrics. Still further, coagulation in the dispersion may occur when excess coating composition is removed by doctor blades.

These problems are particularly noticeable when the PTFE dispersion used to prepare the final coating composition has a low amount of fluorinated surfactant. Such PTFE dispersions are nevertheless desirable from an environmental point of view.

Accordingly, it is desirable to overcome or at least to reduce the aforementioned problems. Desirably, the aforementioned problems are reduced or resolved without impairing or substantially impairing the good mechanical and physical properties of PTFE. Preferably the solution should be easy and convenient and should be cost effective and environmentally friendly.

DESCRIPTION

In one aspect the present invention provides an aqueous non-melt processable polytetrafluoroethylene dispersion comprising non-melt processable polytetrafluoroethylene particles in an amount between 30 and 70% by weight based on the total weight of the dispersion and one or more non-ionic surfactants and wherein at least a part of said non-melt processable polytetrafluoroethylene particles comprise polytetrafluoroethylene polymer chains having repeating units comprising ionic groups.

By the term "non-melt processable polytetrafluoroethylene" is meant that the melt viscosity of the polytetrafluoroethylene is so high that conventional melt processing equipment cannot be used to process the polytetrafluoroethylene. This means in general that the melt viscosity is $>10^{10}$ Pa's.

The aqueous dispersions are less prone to problems of coagulation during application of a final coating composition in which the dispersions are combined with further components and in particular organic solvents. Even when the dispersions are low in fluorinated surfactant content, the dispersions have a good stability and are generally not prone to the problems of coagulation when the dispersion is combined with other components to produce a final coating composition. Accordingly, highly stable and environmentally friendly dispersions can be produced. Further, the dispersions may be conveniently and cost effectively produced.

In a further aspect, the invention provides a method of making an aqueous dispersion of non-melt processable polytetrafluoroethylene, the method comprising an aqueous emulsion polymerization of an amount of tetrafluoroethylene and up to 1% by weight, preferably up to 0.5% by weight based on the amount of tetrafluoroethylene so as to produce an amount of polytetrafluoroethylene solids at the end of the polymerization, of a comonomer having an ionic group or precursor thereof, wherein said aqueous emulsion polymerization is initiated with a free radical initiator and the polymerization is carried out in the presence of a fluorinated surfactant and adding one or more non-ionic surfactants to the thus obtained aqueous dispersion.

Polymerization Process

The aqueous dispersions of PTFE can be produced using an aqueous emulsion polymerization of TFE and one or more comonomers having an ionic group or precursor thereof. For sake of convenience, the comonomer will be abbreviated hereinafter as 'ionic comonomer' notwithstanding that the monomer may itself not be ionic as in the case where the monomer includes only a group that is a precursor of an ionic group. The amount of ionic comonomer fed to the polymerization is generally not more than 1% by weight, preferably not more than 0.5% by weight of the amount of TFE fed during the polymerization to produce a final amount of PTFE solids at the end of the polymerization.

Although the ionic comonomer can be added at any stage in the polymerisation, at least a portion thereof and preferably all of the ionic comonomer is co-fed with TFE during the final polymerization stage. By 'final polymerization stage' is meant the stage at which at least 80%, preferably at least 85% and more preferably at least 90% by weight of the total amount of TFE has been fed to the polymerization. When a seeded polymerization using PTFE particles is used, the final polymerization stage is determined relative to the total amount of TFE fed to the seeded polymerization without accounting for the amount of TFE used to produce the seed particles.

Examples of ionic groups in the ionic comonomer include acid groups or salts thereof such as carboxylic acid, sulfonic acid, phosphoric or phosphonic acid. Precursor groups of ionic groups include groups that upon hydrolysis yield an ionic group such as for example esters, which upon hydrolysis yield an acid group or a salt thereof, nitrile groups that upon hydrolysis yield a carboxylic acid group and $SO_2F$ groups that upon hydrolysis yield sulfonic acid groups or salts thereof. Preferably, the ionic comonomer is a perfluorinated monomer including for example a perfluorinated allyl or vinyl ether having one or more ionic groups or precursors thereof.

According to a particular embodiment, the ionic comonomer corresponds to the general formula:

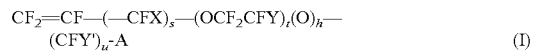

wherein s is 0 or 1, t is 0 to 3; h is 0 to 1; u is 0 to 12; X represents —F, —Cl or —$CF_3$; Y and Y' independently represent —F or a $C_{1-10}$ perfluoralkyl group; A represents an ionic group or a precursor thereof —CN, —COF, —COOH, —COOR, —COOM, or —COONRR', —$SO_2F$, —$SO_3M$, —$SO_3H$, —$PO_3H_2$, —$PO_3RR'$, —$PO_3M_2$; M represents an alkali metal ion or a quarternary ammonium group; R and R' represent a hydrocarbon group such as e.g. a $C_{1-10}$ alkyl group and R and R' may be the same or different.

According to a further embodiment, the ionic comonomer corresponds to the general formula:

wherein $R_f$ represents a perfluoroalkylene group optionally interrupted by one or more oxygen atom and Z represents a carboxylic acid group, a salt thereof or a precursor thereof such as an ester of the formula COOR wherein R represents a hydrocarbon group such as an alkyl group or an aryl group, or a sulfonic acid group, a salt thereof or a precursor thereof such as $SO_2F$. In one embodiment, $R_f$ represents a perfluoroalkylene group having between 2 and 8 carbon atoms. Alternatively, $R_f$ may be a perfluoroether group e.g. corresponding to the formula A or B:

wherein n is an integer of 1 to 6, x is an integer of 1 to 5, m is an integer of 1 to 4 and k is an integer of 0 to 6;

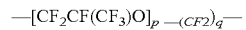

wherein p is in an integer of 1 to 3 and q is an integer of 2 to 4.

When an ionic co-monomer according to formula (II) is used, the resulting repeating units would correspond to the following formula:

—CF₂—CF—O—Rf-G wherein Rf represents a perfluoroalkylene group optionally interrupted by one or more oxygen atoms and G represents a carboxylic acid group or a salt thereof or a sulfonic acid group or a salt thereof and wherein the open valences indicate the linkage of the repeating unit to other repeating units in the polymer chain.

Specific examples of ionic comonomers include:

$CF_2=CF-O-(CF_2)_2-SO_2F$ $CF_2=CF-O-(CF_2)_3-SO_2F$ $CF_2=CF-O-(CF_2)_3-COOCH_3$ $CF_2=CF-O-CF_2CF(CF_3)-O-(CF_2)_2-COOCH_3$ $CF_2=CF-O-CF_2CF(CF_3)-O-(CF_2)_3-COOCH_3$ $CF_2=CF-O-[CF_2CF(CF_3)-O]_2-(CF_2)_2-COOCH_3$ $CF_2=CF-O-CF_2CF(CF_3)-O-(CF_2)_2-SO_2F$ $CF_2=CF-O-[CF_2CF(CF_3)-O]_2-(CF_2)_2-SO_2F$ $CF_2=CF-O-(CF_2)_4-SO_2F$

The polymerization may in addition to the ionic comonomer optionally involve the use of a perfluorinated comonomer such as for example, a perfluorinated vinyl ether, a perfluorinated allyl ether or a perfluorinated $C_3$-$C_8$ olefin such as for example hexafluoropropylene. Particularly useful perfluorinated comonomers that may be used include those corresponding to the formula:

$CF_2=CF-O-R_f$ (III)

wherein $R_f$ represents a perfluorinated aliphatic group that may contain one or more oxygen atoms. Specific examples include perfluoroalkyl vinyl ethers such as perfluoromethyl vinyl ether (PMVE), perfluoroethyl vinyl ether and perfluoro n-propyl vinyl ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

The total amount of such optional further comonomer(s) and ionic comonomer(s) should generally not exceed 1% by weight of the total amount of tetrafluoroethylene. If the amount would be more than 1%, the resulting PTFE will likely be melt-processable and would no longer conform to the ISO 12086 standard defining non-melt processible PTFE.

The aqueous emulsion polymerization is carried out in the presence of a fluorinated surfactant. An effective amount of fluorinated surfactant should typically be used to sufficiently stabilize the PTFE particles and to obtain a desired particle size of the PTFE particles. The amount of fluorinated surfactant is generally between 0.01 and 2%, preferably between 0.05 and 1% by weight relative to the amount of water used in the aqueous emulsion polymerization.

Any of the fluorinated surfactants known or suitable for use in aqueous emulsion polymerization of fluorinated monomers can be used. Particularly suitable fluorinated surfactants are typically anionic fluorinated surfactants that are non-telogenic and include those that correspond to the formula:

$Q-R_f-Z-M^a$ (IV)

wherein Q represents hydrogen, Cl or F whereby Q may be present in terminal position or not; $R_f$ represents a linear or branched perfluorinated alkylene having 4 to 15 carbon atoms; Z represents $COO^-$ or $SO_3^-$, $M^a$ represents a cation including a proton, an alkali metal ion or an ammonium ion.

Representative examples of emulsifiers according to above formula (IV) are perfluoroalkanoic acids and salts thereof such as perfluorooctanoic acid and its salts in particular ammonium salts.

Further fluorinated surfactants that may be used include perfluoropolyether surfactants such as disclosed in EP 1059342, EP 712882, EP 752432, EP 816397, U.S. Pat. No. 6,025,307, U.S. Pat. No. 6,103,843 and U.S. Pat. No. 6,126,849. Still further surfactants that have been used are disclosed in U.S. Pat. No. 5,229,480, U.S. Pat. No. 5,763,552, U.S. Pat. No. 5,688,884, U.S. Pat. No. 5,700,859, U.S. Pat. No. 5,804,650, U.S. Pat. No. 5,895,799, WO 00/22002 and WO 00/71590.

The aqueous emulsion polymerization of TFE is initiated with a free radical initiator. Any of the known or suitable initiators for initiating an aqueous emulsion polymerization of TFE can be used. Suitable initiators include organic as well as inorganic initiators although the latter are generally preferred. Examples of inorganic initiators that can be used include for example ammonium- alkali- or earth alkali salts of persulfates, permanganic or manganic acid or manganic acids. A persulfate initiator can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (available as Rongalite® from BASF Co., Ludwigshafen, Germany) or fluoroalkyl sulfinates as disclosed in U.S. Pat. No. 5,285,002. The reducing agent typically reduces the half-life time of the persulfate initiator. Additionally, a metal salt catalyst such as for example copper, iron or silver salts may be added. Generally, when manganic or permanganic based initiators are used, one may remove the manganic ions subsequent to the polymerization by contacting the resulting dispersion with a cation exchange resin.

The polymerization will typically be conducted at a temperature of 10 to 100° C., preferably between 40° C. and 80° C. and at a pressure of 4 to 30 bar, preferably 8 to 20 bar. The aqueous emulsion polymerization system may further comprise auxiliaries, such as buffers and complex-formers. In a particular embodiment, a seeded polymerization may be used. That is, the polymerization is initiated in the presence of small particles of fluoropolymer, typically small PTFE particles having a volume average diameter of between 50 and 100 nm. Such seed particle dispersions are produced in a separate aqueous emulsion polymerization and may be used in an amount of 20 to 50% by weight based on the weight of water in the aqueous emulsion polymerization. The use of seed particles allows better control over the PTFE particle size that is desired and avoids formation of coagulum during polymerization, which could cause explosion during the polymerization. Also, it is generally preferred that the polymerization conditions are elected such that the particles produced are generally spherical, that is the ratio of the largest to the smallest of two principal orthogonal dimensions of the particles is less than 1.5 and is preferably is between 1 and 1.3. Accordingly, the polymerization should be carried out without taking special measures to cause non-spherical particles such as rods or cylindrical particles to form and thus at least 90% by weight and more preferably at least 99% by weight of the PTFE particles produced will be spherical.

The amount of polymer solids that can be obtained at the end of the polymerization is typically between 10% and 45% by weight, preferably between 20% and 40% by weight and the average particle size (volume average diameter) of the resulting fluoropolymer is typically between 50 nm and 350 nm, preferably between 100 and 300 nm.

Reduction of the Amount of Fluorinated Surfactants

In a preferred embodiment of the present invention, the amount of fluorinated surfactant should be reduced in the aqueous dispersion following the polymerization. The amount of fluorinated surfactant in an aqueous dispersion of PTFE may be reduced in a number of ways. Generally such methods will require the addition of a stabilizing (non fluorinated) surfactant. This stabilizing non-fluorinated surfactant is typically a non-ionic surfactant although other stabilizing surfactants may be suitable as well depending on the technique used to remove the fluorinated surfactant. Preferably, the non-ionic surfactant or mixture of non-ionic surfactants used will be free of aromatic groups as this provides a more environmentally friendly dispersion. Examples of useful non-ionic surfactants include those according to the formula:

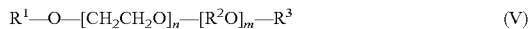

$$R^1-O-[CH_2CH_2O]_n-[R^2O]_m-R^3 \quad (V)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2. It will be understood that in the above formula (V), the units indexed by n and m may appear as blocks or they may be present in an alternating or random configuration. Examples of non-ionic surfactants according to formula (V) above include ethoxylated alkylphenols such as ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8. Still further examples include those in which $R^1$ in the above formula (V) represents an alkyl group of 4 to 20 carbon atoms, m is 0 and $R^3$ is hydrogen. An example thereof includes isotridecanol ethoxylated with about 8 ethoxy groups and which is commercially available as GENAPOL®X080 from Clariant GmbH. Non-ionic surfactants according to formula (V) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

According to one embodiment to reduce the amount of fluorinated surfactant, a non-ionic surfactant, e.g. as disclosed above is added to the fluoropolymer dispersion and the fluoropolymer dispersion is then contacted with an anion exchanger. Such a method is disclosed in detail in WO 00/35971.

The anion exchange process is preferably carried out in essentially basic conditions. Accordingly, the ion exchange resin will preferably be in the OH⁻ form although anions like fluoride, chloride or sulfate may be used as well. The specific basicity of the ion exchange resin is not very critical. Strongly basic resins are preferred because of their higher efficiency in removing the low molecular weight fluorinated surfactant. The process may be carried out by feeding the fluoropolymer dispersion through a column that contains the ion exchange resin or alternatively, the fluoropolymer dispersion may be stirred with the ion exchange resin and the fluoropolymer dispersion may thereafter be isolated by filtration. With this method, the amount of low molecular weight fluorinated surfactant can be reduced to levels below 200 ppm, 150 ppm or even below 10 ppm. Accordingly, dispersions substantially free of fluorinated surfactant may thereby be obtained.

In case the fluorinated surfactant is in its free acid form is steam-volatile, the following method may alternatively be used to reduce the amount of fluorinated surfactant. A steam-volatile fluorinated surfactant in its free acid form may be removed from aqueous fluoropolymer dispersions, by adding a nonionic surfactant to the aqueous fluoropolymer dispersion and, at a pH-value of the aqueous fluoropolymer dispersion below 5, removing the steam-volatile fluorinated surfactant by distillation until the concentration of steam-volatile fluorinated surfactant in the dispersion reaches the desired value. Fluorinated surfactants that can be removed with this process include for example the surfactants according to formula (IV) above.

Still further, the amount of fluorinated surfactant may be reduced to the desired level through the use of ultrafiltration as disclosed in U.S. Pat. No. 4,369,266. Generally, this method will simultaneously also increase the solids amount of the dispersion and thus may be used to simultaneously remove the fluorinated surfactant and upconcentrate the dispersion.

Upconcentration

The aqueous dispersion may be upconcentrated if the resulting PTFE solids are lower than desired. This will typically be carried out subsequent to reducing the level of fluorinated surfactant, if reduction of the level of fluorinated surfactant is desired. It is however also possible to reduce the amount of fluorinated surfactant in an upconcentrated dispersion or simultaneously with the upconcentration as described above. To increase the amount of fluoropolymer solids, any suitable or known upconcentration technique may be used. These upconcentration techniques are typically carried out in the presence of a non-ionic surfactant, which is added to stabilize the dispersion in the upconcentration process. The amount of non-ionic surfactant that should generally be present in the dispersion for upconcentration is typically between 2% by weight and 15% by weight, preferably between 3% by weight and 10% by weight. Suitable methods for upconcentration include ultrafiltration, thermal upconcentration, thermal decantation and electrodecantation as disclosed in GB 642,025.

The method of ultrafiltration comprises the steps of (a) adding non-ionic surfactant to a dispersion that desirably is to be upconcentrated and (b) circulating the dispersion over a semi-permeable ultra-filtration membrane to separate the dispersion into a fluorinated polymer dispersion concentrate and an aqueous permeate. The circulation is typically at a conveying rate of 2 to 7 meters per second and affected by pumps, which keep the fluorinated polymer free from contact with components which cause frictional forces.

To increase the fluoropolymer solids in the aqueous dispersion, thermal decantation may also be employed. In this method, a non-ionic surfactant is added to the fluoropolymer dispersion that is desirably upconcentrated and the dispersion is then heated so as to form a supernatant layer that can be decanted and that typically contains water and some non-ionic surfactant while the other layer will contain the concentrated dispersion. This method is for example disclosed in U.S. Pat. No. 3,037,953 and EP 818506.

Thermal upconcentration involves heating of the dispersion and removal of water under a reduced pressure until the desired concentration is obtained.

Aqueous PTFE Dispersion

An aqueous dispersion suitable for use in preparing a coating composition should contain a non-ionic surfactant to optimize the colloidal stability of the dispersion and to obtain desired properties in the coating. The amount thereof should generally be between 2 and 15% by weight based on the weight of PTFE solids, preferably between 3 and 10% by weight. The amount of non-ionic surfactant may result from the amount of stabilizing surfactant used during the optional removal of the fluorinated surfactant and/or during the optional upconcentration of the dispersion. But the amount of non-ionic surfactant may be adjusted by adding further non-ionic surfactant to achieve a desired level of non-ionic surfactant within the aforementioned range in the dispersion. The dispersion should typically have an amount of PTFE solids in the range of 30 to 70% by weight, preferably between 45 and 65% by weight so as to make the dispersion most suitable for combination with further components to produce a final coating composition for coating substrates such as for example metal.

Particularly preferred aqueous dispersions include those that are free of fluorinated surfactant or that contain the latter in an amount of not more than 200 ppm, typically not more than 100 ppm, preferably not more than 50 ppm and most preferably not more than 30 ppm based on the amount of fluoropolymer solids in the aqueous dispersion.

An aqueous PTFE dispersion according to the invention typically has a shear stability of at least 5 minutes, preferably at least 7 minutes when 150 g of the dispersion adjusted to an amount of PTFE solids of 58% by weight is stirred with 2 g of xylol at a temperature of 20° C. and a stirring rate of 8000 rpm. It has been found that such dispersions can be used to formulate final coating compositions that can be used in existing coating equipment without the risk or with a reduced risk for clogging of spray heads or without the risk or with a reduced risk of coagulation in pumping systems used. Generally the risk of coagulation is reduced sufficiently such that coagulation in a practical application would not occur or not impair the coating process.

The PTFE dispersion may contain a mixture of PTFE particles of different average particle size, i.e. the particle size distribution of the PTFE particles can be bimodal or multi-modal as disclosed in e.g. U.S. Pat. No. 5,576,381 and EP 969 055. Multi-modal PTFE particle dispersions may present advantageous properties. For example, the PTFE dispersion may comprise a mixture of first PTFE particles having an average particle size of at least 180 nm in combination with second PTFE particles that have an average particle size (volume average particle diameter) of not more than 0.7 times the average particle size of the first PTFE particles as disclosed in U.S. Pat. No. 5,576,381. Bimodal or multi-modal PTFE dispersions can be conveniently obtained by blending the aqueous PTFE dispersion of different PTFE particle size together in the desired amounts. It will generally be preferred that the individual PTFE dispersions used to obtain a multi-modal or bimodal PTFE dispersion have been prepared according to the aqueous emulsion polymerization process described above including the use of an ionic comonomer. In particular at least the small PTFE particles, having for example a volume average particle diameter of 50 to 200 nm, in a bimodal or multi-modal dispersion should be prepared according to the aqueous emulsion polymerization process described above as it has been found that these particles have the largest impact on the problems encountered during preparation and use of a final coating composition. Conveniently, at least 30% by weight, preferably at least 50% by weight and most preferably all of the non-melt processable PTFE particles contained in the dispersion are PTFE particles that contain PTFE polymer chains having repeating units that comprise an ionic group.

Additionally, the PTFE dispersion may be mixed with aqueous dispersions of other fluoropolymers, in particular melt-processable fluoropolymers. Suitable dispersion of melt-processable fluoropolymers that can be mixed with the PTFE dispersion include dispersions of the following fluoropolymers: copolymers of TFE and a perfluorinated vinyl ether (PFA) and copolymers of TFE and HFP (FEP). Such dispersions may be monomodal, bi-modal or multimodal as disclosed in e.g. EP 990 009.

The PTFE dispersion preferably has a conductivity of at least 500 µS, typically between 500 µS and 1500 µS. When the conductivity is too low, the shear stability may be reduced. The desired level of conductivity of the dispersion may be adjusted by adding a salt thereto such as for example a simple inorganic salt such as sodium chloride or ammonium chloride and the like. Also, the level of conductivity may be adjusted by adding an anionic non-fluorinated surfactant to the dispersion as disclosed in WO 03/020836.

Generally preferred anionic non-fluorinated surfactants are surfactants that have an acid group that has a pKa of not more than 4, preferably not more than 3. It was found that such anionic surfactants in addition to controlling the viscosity, are generally also capable of increasing the stability of the fluoropolymer dispersion. Examples of non-fluorinated anionic surfactants include surfactants that have one or more anionic groups. Anionic non-fluorinated surfactants may include in addition to one or more anionic groups also other hydrophilic groups such as polyoxyalkylene groups having 2 to 4 carbons in the oxyalkylene group, such as polyoxyethylene groups, or groups such as such as an amino groups. Nevertheless, when amino groups are contained in the surfactant, the pH of the dispersion should be such that the amino groups are not in their protonated form. Typical non-fluorinated surfactants include anionic hydrocarbon surfactants. The term "anionic hydrocarbon surfactants" as used herein comprises surfactants that comprise one or more hydrocarbon moieties in the molecule and one or more anionic groups, in particular acid groups such as sulphonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero atoms such as, for example, oxygen, nitrogen and sulfur.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Emulsogen™ LS (sodium lauryl sulfate) and Emulsogen™ EPA 1954 (mixture of C12 to C14 sodium alkyl sulfates) available from Clariant GmbH and TRITON™ X-200 (sodium alkylsulfonate) available from Union Carbide. Preferred are anionic hydrocarbon surfactants having a sulfonate group. Further optional components that may be present in the aqueous PTFE dispersion include buffering agents and anti-oxidizing agents.

The PTFE dispersions of the present invention can be used to produce final coating compositions for coating various substrates such as metal substrates, e.g. cookware, fabrics such as glass fiber based fabrics which may be used as architectural fabrics. Generally, the PTFE dispersions will be blended with further components typically used to produce a final coating composition. Such further components may be dissolved or dispersed in an organic solvent such as toluene, xylol and the like. Typical components that are used in a final coating composition include heat resistant polymers such as polyamide imide, polyimide or polyarylen sulphide. Still further ingredients such as pigments and mica particles may be added as well to obtain the final coating composition. The PTFE dispersions typically represent about 10 to 80% by weight of the final composition. Details on coating compositions for metal coatings and components used therein have been described in e.g. WO 02/78862, WO 94/14904, EP 22257 and U.S. Pat. No. 3,489,595.

EXAMPLES

The invention is further described with reference to the following examples without however the intention to limit the invention thereto.

Abbreviations

MV4S: $CF_2CFO(CF_2)_4SO_2F$

Methods

Determination of Solid Content and Nonionic Emulsifier

Both quantities are gravimetrically determined according to ISO 12086. Figures of Nonionic Emulsifier Content given in the Examples are based on solids content and are supposed to be accurate to ±5%. Figures of solids content given in the Examples, are accurate to ±1%. Correction for not volatile inorganic salts was not considered.

Particle Size

Particle size of the PTFE particles was measured via inelastic light scattering using a Malvern 1000 HAS Zetasizer. The average particle size is reported as the volume average diameter.

Determination of APFO

APFO-content is determined via gas chromatography of the methyl ester using an internal standard, e.g. the methyl ester of perfluoro decanoic acid. To quantitatively convert APFO to the methyl ester, 200 µl dispersions are treated with 2 ml methanol and 1 ml acetylchloride in presence of 0.3 g MgSO4 for 1 hour at 100° C. The formed methyl ester is extracted with 2 ml hexane and subjected to gas chromatography analysis. Detection limit is <5 ppm. Figures of APFO-content given in the Examples are based on solids of the dispersion.

Conductivity

Conductivity was measured with the 712 Conductometer, supplied by Metrohm AG. In case that the conductivity of dispersions was less than 1000 µS/cm aqueous ammonium sulfate solution (1%) was added before the up-concentration to adjust the conductance to about 1000 µS/cm.

Polymerization

A stainless steel 150 l polymerization vessel equipped with a 3 finger paddle-agitator and baffles were used. Agitation speed was 210 rpm and kept constant during the polymerization. The polymerization rate was measured via the flow of TFE into the reactor. The average polymerization rate was in the range of 12 to 16 kg/hours. PTFE formed via the displacement of TFE from the vapor space by the volume of formed polymer was not taken into account. Temperature and TFE pressure was kept constant during polymerization.

Shear Stability Test 150 g dispersion, thermostated to 20° C., are put in a 250 ml standard glass beaker of an inner diameter of 65 mm. The agitation head of an Ultra Turrax T25, supplied by Janke & Kunkel, is immersed in the center of the beaker such that the end of the head is 7 mm above the beaker bottom. The Ultra Turrax is switched on at a revolution speed of 8000 rpm. Agitation renders the surface of the dispersion "turbulent" or "wavy". After 10 to 20 sec, 2.0 g xylene are added dropwise within less than 10 sec to the agitated dispersion. Time measurement starts with the addition of xylene and is stopped when the surface of the agitated dispersion does not show any more visible turbulence. The surface "freezes" or smoothes due to coagulation. Coagulation is accompanied by a characteristic change of sound of the Ultra Turrax. In case that the "surface freezing" cannot be clearly observed due to foam formation time measurement is stopped with the onset of the change of sound. Figures given in the Examples are the average of 5 measurements. Observed reproducibility is 10%.

Removal of Fluorinated Surfactant: Ammonium Perfluorooctanoic Acid (APFO)

The dispersions as obtained from the polymerization are called raw dispersions. To the raw dispersions were added 2% Triton® X 100 based on weight of solids. 100 ml of anion exchange resin Amberlite® IRA 402 in the OH⁻ form were added to 1 l raw dispersion. The mixture was gently agitated for 12 hour and the exchange resin was filtered off via a glass sieve. The APFO content was below 20 ppm based on the solids of the dispersion.

Upconcentration

If necessary the conductivity of the APFO-reduced dispersions was adjusted to a conductance of 500 µS/cm by adding aqueous ammonium sulfate solution. They then were thermally up-concentrated via evaporation to a solid content of about 58% in presence of a non-ionic surfactant. Triton® X 100 as supplied by Dow Chemical was used as the non-ionic surfactant. The amount of the non-ionic surfactant was 5% based on the total amount of solids. If necessary, pH was adjusted to 9 by adding aqueous ammonia and the conductivity adjusted to about 1000 µS/cm by adding aqueous ammonium sulfate solution. The thus up-concentrated dispersions were subjected to the shear test described above.

Example 1

Preparation of Seed Latex 100 l deionized water containing 400 g ammonium perfluoro octanoate (APFO) were fed in a 150 l polymerization vessel. Air was removed by alternating evacuation and pressurizing with nitrogen up to 6 bar. Then 140 g HFP are fed in the vessel. The temperature in the vessel was adjusted to 35° C. The vessel was pressurized with TFE to 15 bar (abs.). Then 100 ml deionized water containing 0.6 g $Na_2S_2O_5$, 25 g 25% ammonia solution and 20 mg $CuSO_4 \times 5H_2O$ were pumped in the vessel. The polymerization was started by quickly pumping 100 ml deionized water containing 1.1 g APS in the vessel. Polymerization temperature and pressure were kept constant. Uptake rate of TFE was adjusted to about 12 kg/h by properly adjusting the speed of agitation. When 11 kg TFE were consumed, polymerization was stopped by closing the TFE-feeding and lowering the speed of agitation. The vessel was vented and the resulting dispersion discharged. The thus obtained dispersion had a solid content of 10% and particle size of about 100 nm. This dispersion is called in the following "seed latex".

Example 2

20 l seed latex prepared as described in Example 1 were charged in the 150 l polymerization vessel together with 80 l deionized water containing 270 g ammonium octanoate. Air was removed as described in Example 1. The vessel was pressurized with TFE to 15 bar abs. and the temperature adjusted to 42° C. Polymerization was conducted at constant pressure and temperature. 200 ml aqueous solution containing 0.7 g APS, 20 mg $CuSO_4 \times 5H_2O$ and 60 g 25% aqueous ammonia solution were charged into the vessel. Polymerization was initiated by continuously pumping in the vessel an aqueous solution containing 0.15 g azodicarboxyl diamide (ADA) dissolved in 3000 ml deionized water containing 15 ml 10% NaOH. The ADA solution to be continuously fed had a concentration of 0.05 g ADA/l. Pumping rate for the first 10 min was 50 ml/min and then lowered to 15-25 ml/min. Feeding rate and agitation speed was adjusted to achieve an uptake rate for TFE of about 12 kg/h. When 22 kg TFE were consumed, polymerization was stopped by interrupting the feeding of the ADA-solution and TFE. The vessel was vented and the dispersion was discharged. The so obtained dispersion had a solid content of about 21 wt-% and a particle size of 220 nm.

APFO was removed by ion-exchange and the dispersion was thermally up concentrated to a solid content of 58% according to the above described procedures. The thus obtained dispersion showed a shear stability of 4:15 min.

Example 3

Use of an Ionic Comonomer

Polymerization was carried out as described in Example 2 except that when 90% by weight of the TFE had been fed to the polymerization, feeding of ADA was stopped and a solution of 0.6 g $Na_2S_2O_5$ in 50 g water was first charged into the vessel followed by a solution containing 0.8 g APS, 20 mg $CuSO_4 \times 5H_2O$ and 60 g 25% aqueous ammonia solution in 150 ml water. After that 340 g of an emulsion of MV4S in an ammonium perfluoro octanoate solution where injected in the polymerization vessel. The MV4S emulsion was prepared by stirring 170 g MV4S and 170 g 0.5% ammonium perfluoro octanoate solution for 1 min at 20 000 rpm with a high shear stirring system (IKA Ultra Turrax T25, Tool: S 25-KV-25 F). When a total amount of 23 kg TFE was consumed, polymerization was stopped by closing the TFE-feeding. The vessel was vented and the dispersion discharged.

The dispersion was added 2 wt-% Triton® X 100 based on solid content and 5 mMoles $NH_3$/l dispersion. The APFO was removed by ion-exchange and the dispersion was upconcentrated according to the procedures described above. The thus obtained dispersion had a shear stability of >30 min.

What is claimed is:

1. A composition comprising an aqueous non-melt processible polytetrafluoroethylene dispersion containing non-melt processible polytetrafluoroethylene particles in an amount between 30 and 70% by weight based on the total weight of the dispersion and one or more non-ionic surfactants, wherein one or more the non-melt processible polytetrafluoroethylene particles comprise polytetrafluoroethylene polymer chains containing repeating units comprising ionic groups, and wherein the total amount of repeating units containing ionic groups is not more than 1% by weight based on the total weight of polytetrafluoroethylene particles comprising polytetrafluoroethylene polymer chains that contain repeating units comprising ionic groups.

2. An aqueous non-melt processible polytetrafluoroethylene dispersion according to claim 1 wherein the ionic groups comprise carboxylic or sulfonic acid groups or salts thereof.

3. An aqueous non-melt processible polytetrafluoroethylene dispersion according to claim 1 wherein the repeating units comprising ionic groups are derivable from a perfluorinated monomer having an ionic group or precursor thereof.

4. An aqueous non-melt processible polytetrafluoroethylene dispersion according to claim 3 wherein the perfluorinated monomer corresponds to the general formula:

wherein $R_f$ represents a perfluoroalkylene group optionally interrupted by one or more oxygen atoms and Z represents a carboxylic acid group, a salt thereof or a precursor thereof, or a sulfonic acid group, a salt thereof or a precursor thereof.

5. An aqueous non-melt processible polytetrafluoroethylene dispersion according to claim 1 wherein the repeating units containing an ionic group correspond to the general formula:

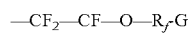

wherein $R_f$ represents a perfluoroalkylene group optionally interrupted by one or more oxygen atoms and G represents a carboxylic acid group or a salt thereof or a sulfonic acid group or a salt thereof and wherein the open valences indicate the linkage of the repeating unit to other repeating units in the polymer chain.

6. An aqueous non-melt processible polytetrafluoroethylene dispersion according to claim 1 wherein the amount of fluorinated surfactant in the dispersion is not more than 200 ppm based on the amount of fluoropolymer solids.

7. An aqueous non-melt processible polytetrafluoroethylene dispersion according to claim 1 wherein the total amount of non-melt processible polytetrafluoroethylene particles is between 45 and 65% by weight and wherein the one or more non-ionic surfactants are present in a total amount of 2 to 15% by weight based on the total weight of polytetrafluoroethylene solids.

8. An aqueous non-melt processible polytetrafluoroethylene dispersion according to claim 1 wherein the non-melt processible polytetrafluoroethylene particles, characterized by polytetrafluoroethylene polymer chains containing repeating units comprising ionic groups, comprise at least 30% by weight of the total weight of non-melt-processible polytetrafluoroethylene particles.

9. A method comprising coating a substrate utilizing an aqueous non-melt processible polytetrafluoroethylene dispersion as defined in claim 1.

* * * * *